April 12, 1932.  P. R. HAHNEMANN  1,853,766
NONREPEATING CLUTCH
Filed Dec. 29, 1930  3 Sheets-Sheet 1
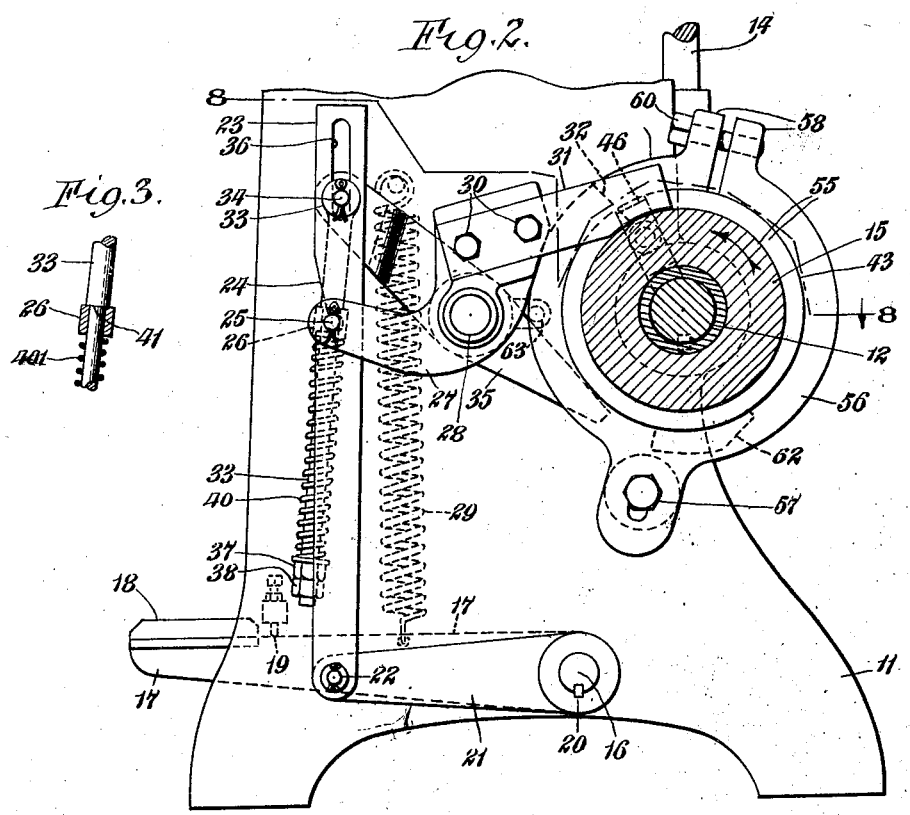

April 12, 1932. P. R. HAHNEMANN 1,853,766
NONREPEATING CLUTCH
Filed Dec. 29, 1930 3 Sheets-Sheet 2
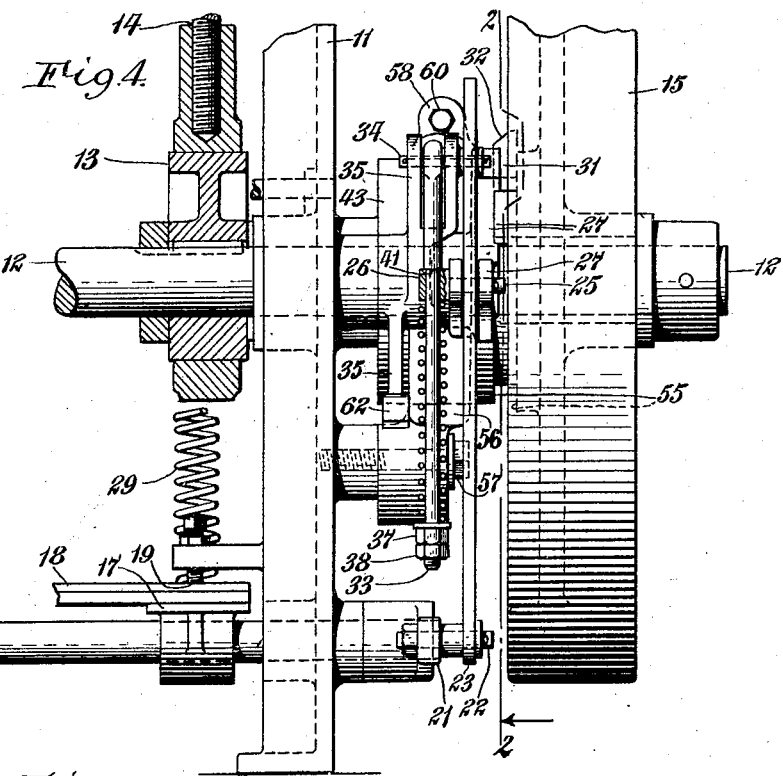
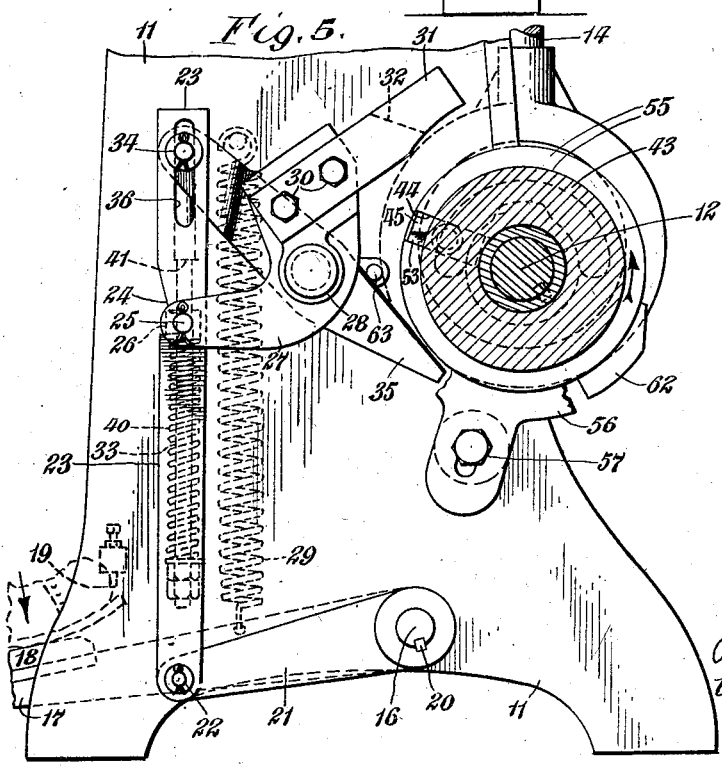
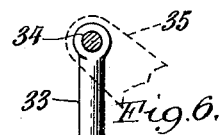
Inventor
Paul R. Hahnemann
by Popp & Powers
Attorneys

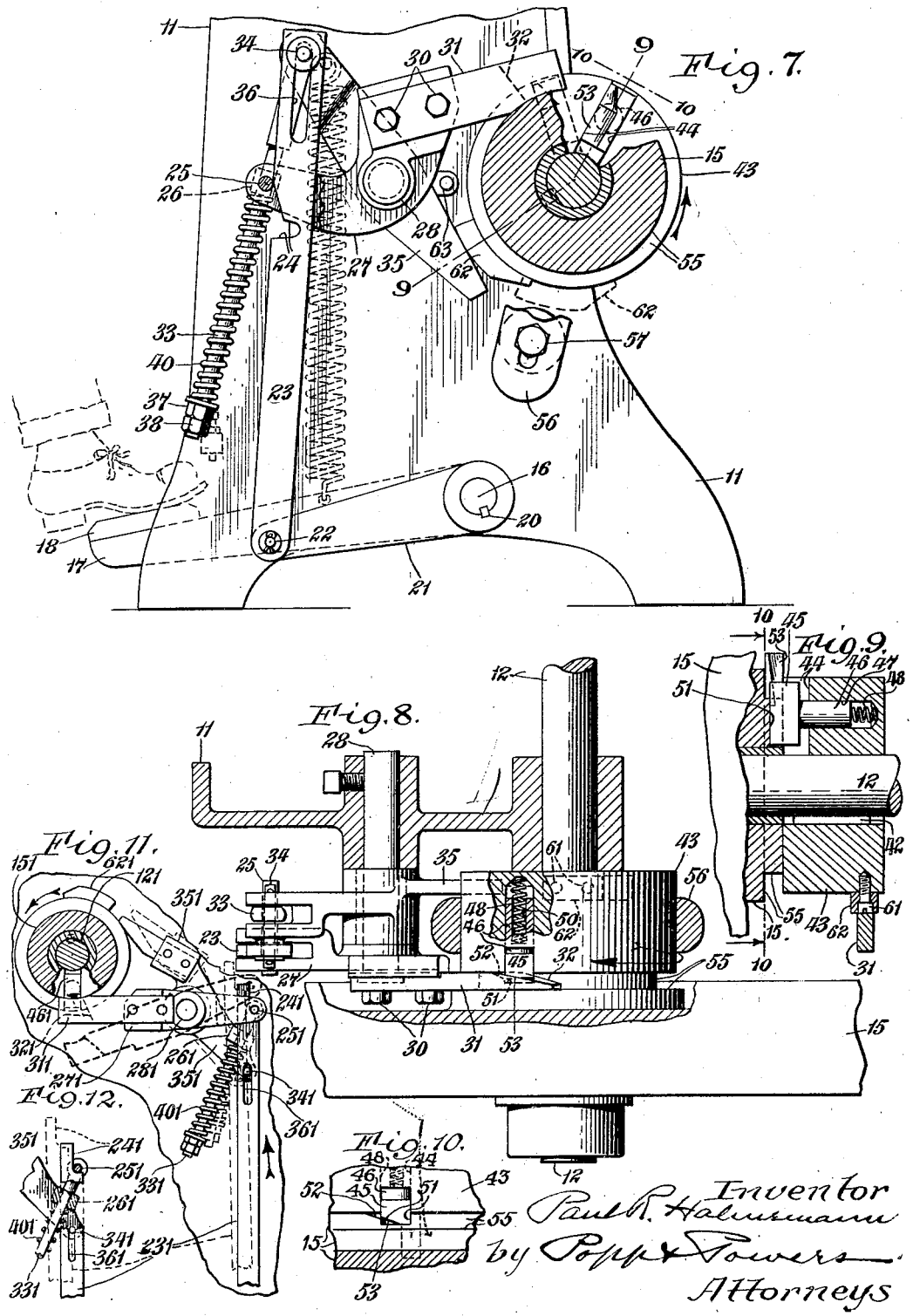

Patented Apr. 12, 1932

1,853,766

UNITED STATES PATENT OFFICE

PAUL R. HAHNEMANN, OF BUFFALO, NEW YORK, ASSIGNOR TO NIAGARA MACHINE & TOOL WORKS, OF BUFFALO, NEW YORK, A CORPORATION OF NEW YORK

NONREPEATING CLUTCH

Application filed December 29, 1930. Serial No. 505,234.

This invention relates to a manually operable clutch for a power driven machine such as a shears or punch press, and more particularly relates to that type of clutch in which the main shaft of the machine is rotated once and only once for each manual actuating of said clutch, irrespective of the length of time said manual pressure is being exerted.

The principal object of the invention is to provide a reliable and sturdy clutch of this "nonrepeating" character in which a minimum amount of machine work upon the main frame is required and which is otherwise so constructed as to be low in manufacturing cost. Numerous other collateral objects of the invention and practical solutions thereof are disclosed in detail in the herein patent specification wherein:

In the accompanying drawings:

Figure 1 is a diminutive front elevation of a power shears equipped with my improved nonrepeating clutch.

Figure 2 is a fragmentary vertical, transverse section through the power shears taken on line 2—2, Figs. 1 and 4, showing the various parts in their normal or inoperative position.

Figure 3 is a fragmentary, vertical, transverse, section through a portion of the clutch mechanism in the position which said parts occupy in Figure 2.

Figure 4 is a fragmentary front elevation of the power shears showing the clutch parts in the same position as Figure 2.

Figure 5 is a fragmentary, vertical, transverse section through the power shears similar to Figure 2 but with the clutch engaged by reason of manual pressure on the treadle bar.

Figure 6 is a fragmentary, vertical, transverse section through a portion of the clutch mechanism similar to Figure 3 but in the position which said parts occupy in Figure 5.

Figure 7 is a fragmentary, vertical, transverse section through the power shears similar to Figures 2 and 5 but with the automatic clutch moved to its uncoupled position, this taking place even though the manual pressure upon the treadle is still being applied.

Figure 8 is a fragmentary horizontal section through the power shears taken on line 8—8 of Figure 2.

Figure 9 is a fragmentary oblique section through the coupling of the clutch taken on line 9—9 of Figure 7.

Figure 10 is a fragmentary horizontal section through said coupling taken on line 10—10 of Figure 7.

Figure 11 is a diminutive, fragmentary, vertical, transverse section through a power drive machine showing a modified "overhead" form of the invention.

Figure 12 is a detailed, vertical, transverse section through certain of the parts shown in Figure 11.

In the following description, similar characters of reference indicate like parts in the several figures of the drawings.

My invention may be embodied in various forms and in non-repeating clutches of different constructions, and the present applications are therefore to be regarded merely as some of the possible organizations which come within the scope of my invention and satisfactorily carry out the function of same in practice. As here shown (referring for the present to Figs. 1–10) the same is constructed as follows as applied to a power shears:

The main frame of said power shears is principally constituted of the vertical, transverse, end supports 10 and 11 in which is suitably journaled a horizontal, longitudinal main shaft 12. The latter drives the operating mechanism A of the machine through a pair of eccentrics 13, connecting rods 14, etc. or by any other suitable mechanism which performs the desired results, the particular organization of said mechanism depending on the nature of the work produced by the machine. This matter has no pertinency to the present invention except that the usefulness of this invention is confined to that type of machinery (shears, punch press and the like) in which it is desirable that a single manual manipulation of the machine cause one and only one rotation of the main shaft 12. Journaled upon the outboard end of said main shaft 12 is a pulley drive wheel 15 which is belt driven from a line shaft or is otherwise arranged to derive power from an external source of power in any one of the usual and well known manners.

It is the function in general of the present invention to couple and uncouple this pulley wheel 15 with said main shaft 12.

A horizontal, longitudinal, rock shaft 16 is pivotally mounted at its opposite ends in the lower parts of the frame end supports 10 and 11 and has secured thereto, adjacent the inner faces of said end supports, a pair of treadle arms 17—17 which extend transversely forward and approximately horizontally from said rock shaft 16 and have secured to their outermost ends a suitable, horizontal, longitudinal treadle bar 18. This treadle bar is adapted to receive the manual downward pressure of the operator's foot as indicated by dotted lines in Figs. 5 and 7. Upward movement of said treadle bar is limited by a suitable pair of stops 19 which are mounted on the inner faces of the frame end supports 10 and 11 and adjustably engage with the upper faces of their companion treadle arms 17—17. Said treadle arms are resiliently urged toward their uppermost positions by a suitable pair of tension springs 29 whose upper ends are connected to the frame end supports 10 and 11.

Secured by a key 20 or otherwise to the outboard end of said rock shaft 16 is a rock arm 21 which extends laterally and forwardly and approximately horizontally from said rock shaft, adjacent the outer face of the one frame end support 11. Pivoted to the outer end of said rock arm 21 at 22 is an upstanding or approximately perpendicular draw bar 23. The latter is provided, intermediately of its length, with a forwardly-opening, horizontal, lateral notch 24, which is adapted to receive the projecting cylindrical end or "flying" pivot 25 of a trunnion 26, the latter being permanently and pivotally connected with the front, bifurcated arm of an engaging lever 27. Said engaging lever is fulcrumed at 28 on the frame of the machine (i. e., on the frame end support 11) and has secured thereto by cap screws 30 or otherwise a hardened steel engaging blade 31 whose inner, rear face is suitably bevelled at 32, as best shown in Fig. 8.

Said trunnion 26 is bored out to slidably receive the intermediate portion of a swinging rod 33 whose upper end is pivotally connected at 34 to the front, bifurcated arm of a throw-out lever 35. Said pivot 34 extends outwardly some distance beyond said throw-out lever 35 and is slidably and rotatably received within a relatively long slot 36 formed longitudinally in the upper end of the draw bar 23. Said throw-out lever 35 is fulcrumed at 28 upon the frame end support 11, this being the same fulcrum which carries the engaging lever 27.

The lowermost end of the swinging rod 33 is provided with an adjusting nut and washer 37 and also a lock nut 38. A helical compression spring 40 receives within its bore the lower end of said swinging rod 33, the upper end of said spring bearing against the lower face of aforesaid trunnion 26 (see Fig. 6), while the lower end of said spring bears against the upper face of said adjustment nut and washer 37. Upward movement of said trunnion 26 relatively to the swinging rod 33 (upon which said trunnion slides) is limited by a stop shoulder 41, the function of which will hereinafter be described.

Secured by a key 42 or otherwise (see Fig. 9) to said outboard end of said main shaft 12 intermediately of the outer face of the frame end support 11 and the inner end of the hub of the pulley drive wheel 15 is a cylindrical coupling head or clutch collar 43, in the outer face of which is formed a square faced, radially-extending retaining groove 44. Slidably arranged in said retaining groove 44 is the rectangular head 45 of a clutch dog 46 whose inner end is cylindrically formed and is slidably received within a cylindrical socket 47 which is bored longitudinally into the outer face of said clutch collar 43. The axis of said cylindrical socket 47 is parallel to but is eccentric with respect to the axis of the main shaft 12. Said clutch dog 46 is resiliently urged longitudinally outwardly by a suitable compression spring 48, whose inner end abuts against the transverse bottom wall of said cylindrical socket 47, while its outer end (see also Fig. 8) abuts against the transverse bottom wall of a cylindrical pocket 50 which is formed coaxially in said clutch dog 46 and extends longitudinally outwardly from the inner transverse face thereof. It will be noted that the generous proportions and shape of the rectangular head 45 of said clutch dog 46 enables a heavy and suddenly applied load to be transmitted tangentially (without deformation of any of the parts) from said clutch dog 46 to the clutch collar 43 in which latter said clutch dog longitudinally slides.

Formed in the inner face of the hub of the pulley wheel 15 (as best shown in Fig. 10) is a radial clutch keyway 51, having its advancing or leading corner bevelled at 52 to facilitate the longitudinal entrance therein of the clutch dog 46. The latter also is provided with a bevelled end face 53 which bevel additionally aids in facilitating engagement between said clutch dog 46 and the pulley-wheel clutch keyway 51. This bevel 53 of said clutch dog 46 has another function which will hereinafter be described.

When the pulley wheel 15 is rotating in a counterclockwise direction (viewed from the position of Figs. 2, 5, 6 and 7), its radial clutch keyway 51 arrives at a position in which said keyway is in register with the rectangular head 45 of said clutch dog 46 whereupon the latter is thrust longitudinally outward under the influence of its compression spring 48. This forces said clutch dog 46 into said radial clutch keyway 51, and, as said clutch dog is carried by the clutch collar 43, the result is that said pulley wheel 15 is coupled to the main shaft 12, and hence to the entire working mechanism A of the machine. To differentiate between the different functions of the parts constituting the present invention, the term "coupling" will hereinafter be used to designate those parts which directly couple said pulley wheel 15 to said main shaft 12, in contra-distinction to the other cooperating members which only control said "coupling".

As best shown in Figs. 7, 8 and 9, the outer portion of the outer face of said clutch dog 46 is suitably bevelled at 53 as hereinbeforedescribed. This construction enables the same to make a broad faced contact with the bevelled face 32 of the hardened engaging blade 31 of the engaging lever 27. This outer bevelled end of said hardened engaging blade 31 is adapted to be resiliently moved down adjacent the outer or end face of the clutch collar 43 and to be received within a suitable, annular, coaxial rabbet 55 which is formed in the outer, rear corner of the hub of the pulley wheel 15 (see Figs. 2, 7, 8, 9 and 10). When said engagement blade is in this position (down, as in Figs. 2, 7, 8, 9 and 10) any counter clockwise rotation of the main shaft 12 (together with its clutch collar 43, clutch dog 46, etc.) will cause the inclined face 53 of said clutch dog 46 to come into contact with said bevelled face 32 of said engaging blade 31. This action causes said clutch dog to be pushed longitudinally inwardly against the resistance of the clutch dog compression spring 48, and to move the rectangular head 45 of said clutch dog out of the radial keyway 51 of the pulley wheel 15. This disengages the "coupling" between said pulley wheel 15 and the main shaft 12 and thereby uncouples the drive to the operating mechanism A.

When the power being delivered to said main shaft 12 has just been "uncoupled" it is obvious that a certain amount of momentum will still remain in the main shaft and the parts which have been moving therewith. If this momentum is sufficient, the clutch dog 46 might be able to "coast" clear past the engaging blade 31. To cut down this momentum sufficiently, so that such an excessive "coasting" may not occur, a prony brake 56 is loosely pivoted to the machine frame at 57, while its other end is split and is provided with a pair of draw-up ears 58 which are adapted to be adjustably drawn together by a suitable draw-up screw 60. This adjustment need not be at all accurate inasmuch as the clutch dog 46 must coast a considerable distance along the engaging blade 31 before it can again fly out and couple the pulley wheel 15 to the main shaft 12.

Secured by screws 61 or otherwise to the clutch collar 43 is a cam segment 62 (see Figs. 9, 7, 8, 5 and 2). This cam segment is adapted to depress the rear end of the throw-out lever 35 in a manner which can best be understood by an analysis of the mechanism as a whole.

*Operation*

The "normal" position of the parts of the herein clutch is to be taken to indicate that position in which the pulley wheel 15 is rotating at a constant speed but is uncoupled from the main shaft 12 and hence from the operating mechanism A of the power shears or other machine which is equipped with the herein invention. This position (in which no power is being delivered to the main shaft 12) is illustrated in Figs. 1-4, and in this position the engagement blade 31 of the engagement lever 27 is in its lowered position and is pushing the clutch dog 46 inwardly out of engagement with the radial keyway 51 of the pulley wheel 15. In this position, clearance between the lower face of said engaging blade 31 and the periphery of the rabbet 55 is provided by the stop shoulder 41 of the swinging rod 33 against which shoulder the trunnion 26 is urged by the compression spring 40. The swinging rod 33 itself is located in position by being directly pivoted at 34 to the forward arm of the throw-out lever 35, which latter is, in turn, located in limiting position by a suitable stop pin 63 secured to the frame end support 11. Hence, as the trunnion 26 is itself located by the throw-out lever 35 and is pivoted directly to the front arm of the engaging lever 27, such a definite positioning of said trunnion definitely positions said engagement lever and provides the proper clearance between its engagement blade 31 and the hub of the pulley wheel 15. In this "normal" position, the draw bar 23 is definitely located in position by means of the two tension springs 29 which resiliently urge the treadle arms 17—17 up against their adjustable stops 19. Suitable clearance between the throw-out lever 35 and the periphery of the clutch collar 43 is provided by the stop pin 63 aforedescribed.

To cause the mechanism A to operate the operator depresses the treadle bar 18 as shown in Fig. 5. This manual movement causes the draw bar 23 to be depressed and also depresses the flying pivot 25 which is at this time positioned within the lateral notch 24 of said draw bar 23. As this flying pivot 25 passes through the bifurcated forward arm of the engaging lever 27, it follows that the said depressing of said flying pivot elevates the engaging blade 31 and allows the coupling to be engaged so that power flows from the constantly turning pulley wheel 15 to the main shaft 12. In this position of Fig. 5 it will be noticed that the position of the throw-out lever 35 has not been affected by the movement of the treadle bar 18 from the position of Fig. 2 to the position of Fig. 5. This is so because the sliding pivot 34 of said throw-out lever is received within the slot 36 of the draw bar 23 and hence the merely vertical movement of said draw bar 23 has no effect on said throw-out lever 35.

In a power shears, punch press or other machine of the same general character, it is desirable that the main shaft rotate once and only once for every separate depression of the treadle bar 18. To accomplish this desired result, it is necessary to disengage the coupling even though said treadle 18 continues to be depressed as in Fig. 7. In this figure it will be seen that the cam segment 62 (secured to clutch collar 43) has moved around under the rear arm of throw-out lever 35 and has partially rotated the latter in a clockwise direction about its fulcrum 28. This partial rotation of said throw-out lever 35 causes its sliding pivot 34 to be moved somewhat to the rear (to the right in Fig. 7) which also throws the upper end of the draw bar 23 in the same direction. This movement moves the lateral notch 24 of said draw bar 23 out of engagement with the flying pivot 25. At the same time the upward component of the movement of the sliding pivot 34 causes the swing rod 33 to be also moved upwardly, thereby pushing up the lower end of the compression spring 40. The upper end of said spring, in turn, pushes up the trunnion 26 carrying the flying pivot 25 and hence causes the front arm of the engaging lever 27 to be elevated. This causes the clutch dog 46 to be pushed inwardly so as to uncouple the pulley wheel 15 from the main shaft 12. This uncoupled condition continues as long as the operator continues to depress the treadle bar 18 as illustrated in Fig. 7. In this Fig. 7 the throw-out lever 35 is shown as having been turned in a clockwise direction by the momentary position of the cam segment 62. When this cam segment, however, moves past the lower end of this lever 35 said lever is not able to change its position because the just mentioned actuation of said cam segment 62 has permitted the engaging lever 27 to move to its extreme clockwise position, in which position its pivot 25 prevents the upper end of the draw bar 23 from moving forwardly and hence prevents a forward movement of the pin 34 of the throw-out lever 35 and consequently also prevents any counterclockwise rotation of said throw-out lever 35. By this means said throw-out lever 35 maintains the position of Fig. 7 even after the cam segment 62 has passed by its tail end.

If the operator now releases his foot pressure upon the treadle bar 18 then the treadle springs 29 pull up the draw bar 23. Inasmuch as the upper part of said draw bar is at this time being urged outwardly (to the left in Fig. 7) by the pressure of spring 40 and against the flying pivot 25, it follows that as said draw bar 23 moves upwardly relatively to said flying pivot 25, the latter follows along the beveled portion of the notch 24 until it finally arrives opposite the semi-circular part or bottom of said notch, whereupon the flying pivot 25 is no longer able to prevent outward movement of the upper end of the draw bar 23 and hence the spring 40 urges the pivot 34 toward the flying pivot 25 and thereby causes said pivot 34 to swing down and outwardly about its axis of rotation 28. This causes the upper end of the draw bar 23 to move outwardly until the flying pivot 25 is snugly lodged in the notch 24 and the throw-out lever 35 is limited in its further counter-clockwise rotation (as seen in Fig. 7) by the stop 63. This brings all of the parts of the clutch back to the position thereof shown in Fig. 2, which represents the beginning of the cycle of operations, in which case the treadle bar 18 is again in position to again be depressed by the operator so as to again couple the fly wheel 15 to the main shaft 12.

A modified form of the invention is illustrated in Figs. 11 and 12. In this case the geometrical relationship and functioning of the parts is very similar to that of the construction of Figs. 1–10 inclusive except that the coupling of the parts is effected by an upward instead of a downward movement of a draw bar 231. In this case the engaging lever 271 and the throw-out lever 351 are both pivoted upon a common fulcrum 281, and said engaging lever is provided with a hardened steel engaging blade 311 which is provided with a bevelled end 321 and is adapted to actuate the clutch dog 461. The latter is adapted to couple the pulley wheel 151 with the main drive shaft 121 whenever aforesaid draw bar 231 is moved upwardly, and to uncouple said pulley wheel and drive shaft whenever said draw bar is manually retained in its elevated position, or is manually moved to its lowermost position very shortly after the coupling has been effected and before the main drive shaft 121 has rotated more than the major part of one single revolution.

Said draw bar 231 is provided with a slot 361 in which is slidably received a sliding pivot 341, the latter being arranged at the outer end of the throw-out lever 351. Pivotally arranged (adjacent said pivot 341) at the outer end of said throw-out lever is a trunnion 261 (see Fig. 12) through which slides a swinging rod 331 carrying a compression spring 401 at its lower end. The upper end of said swinging rod is pivoted at 251 directly to the outer end of the engaging lever 271. This pivot 251 normally rests in a lateral notch 241 so that when said draw bar 231 is moved upwardly, the outer end of said engaging lever 271 is also raised and the clutch dog 461 allowed to spring out and couple the pulley wheel 151 and main shaft 121. If, however, said draw bar 231 be retained in its manually elevated position, a cam segment 621 arrives at a point in its rotation where it is enabled to upwardly and outwardly move the inner end of the throw-out lever 351. This partial, clockwise rotation of said throw-out lever causes its sliding pivot 341 to move inwardly and to move the lateral notch 241 out of engagement with the flying pivot 251 and thus permitting the engaging lever 271 to be moved in a clockwise direction. The force which is necessary for this clockwise partial rotation of said engaging lever 271 is obtained as a result of the downward movement of the trunnion 261 which compresses the spring 401 and hence pushes down against the lower end of the swinging rod 331, which latter in turn depresses its flying pivot 251 and thereby elevates the inner end of the engaging lever 271.

In both embodiments of the invention, it will be noted that very little machine work upon the main machine frame and relating to the clutch mechanism is required. Furthermore, the entire construction is such that despite its rather peculiar geometrical movements, each component part is simple, rugged and durable and may be manufactured with generous dimensional tolerances.

I claim as my invention:

1. A nonrepeating clutch associated with a machine having a frame, a main shaft, a power drive and a coupling adapted to connect said power shaft and power drive and comprising a longitudinally and manually movable draw bar having a longitudinal slot; a throw-out lever having one of its arms slidably pivoted in said slot and actuated by said main shaft; an engaging lever connected with said draw bar and resiliently connected with the sliding pivot of said throw-out lever; and means for disconnecting said draw bar from said engaging lever and permitting the resilient connection between said throw-out lever and engaging lever to move the latter to its clutch disengaging position.

2. A nonrepeating clutch associated with a machine having a frame, a main shaft, a power drive and a coupling adapted to connect said power shaft and power drive and comprising a longitudinally and manually movable draw bar having a transverse notch and a slot; an engaging lever arranged to control said coupling and having a flying pivot normally received within said lateral notch; a trunnion head pivoted to said engagement lever; a swinging rod slidably connected with said trunnion head; a spring interposed between said swinging rod and said engaging lever; and a throw-out lever actuated by said main shaft and provided with a sliding pivot which slides within said slot of said draw bar and also pivotally connects said throw-out lever with said swinging rod.

3. A nonrepeating clutch associated with a machine having a frame, a main shaft, a power drive and a coupling adapted to connect said power shaft and power drive and comprising a longitudinally and manually movable draw bar having a transverse notch and a slot; an engaging lever arranged to control said coupling and having a flying pivot normally received within said lateral notch; a trunnion head pivoted to said engagement lever; a swinging rod slidably connected with said trunnion head; and having a stop shoulder which bears against said trunnion head and thereby locates said engaging lever in position to provide operating clearance when the various parts are in their normal position.

4. A nonrepeating clutch associated with a machine having a frame, a main shaft, a power drive and a coupling adapted to connect said power shaft and power drive and comprising a longitudinally and manually movable draw bar having a transverse notch and a slot; an engaging lever arranged to control said coupling and having a flying pivot normally received within said lateral notch; a trunnion head pivoted to said engagement lever; a swinging rod slidably connected with said trunnion head; a spring interposed between said swinging rod and said engaging lever; a throw-out lever fulcrumed on the same fulcrum as that of said engaging lever; a sliding pivot which slides within said slot of said draw bar and pivotally connects said throw-out lever with said swinging rod.

5. A nonrepeating clutch associated with a machine having a frame, a main shaft, a power drive and a coupling adapted to connect said power shaft and power drive and comprising a longitudinally and manually movable draw bar having a transverse notch; an engagement lever arranged to control said coupling and fulcrumed on said frame and having a flying pivot which is adapted to be received within said transverse notch; a throw-out lever actuated by said main shaft and also fulcrumed on said frame and adapted to move said draw bar laterally to disengage the same from said engaging lever; a swinging rod pivoted to said engaging lever; and an adjustable spring interposed between said swinging rod and said engaging lever.

6. A nonrepeating clutch associated with a machine having a frame, a main shaft, a power drive and a coupling adapted to connect said power shaft and power drive and comprising a longitudinally and manually movable draw bar having a transverse notch and a slot; an engagement lever arranged to control said coupling and having a flying pivot which is adapted to be received within said transverse notch; a throw-out lever actuated by said main shaft and having a sliding pivot which is received within said slot and normally bears against one end thereof to definitely limit the movement of said throw-out lever in the one direction, said throw-out lever being adapted to laterally move said draw bar out of engagement with said engaging lever; and a resilient connection between said engaging lever and said throw-out lever.

7. A nonrepeating clutch associated with a machine having a frame, a main shaft, a power drive and a coupling adapted to connect said power shaft and power drive and comprising a draw bar adapted to be moved manually and longitudinally; a swinging rod; an engaging lever arranged to control said coupling and slidably connected with said swinging rod and detachably and pivotally connected with said draw bar; and a throw-out lever actuated by said main shaft and pivoted to said swinging rod and slidably and pivotally connected with said draw bar.

8. A nonrepeating clutch associated with a machine having a frame, a main shaft, a power drive and a coupling adapted to connect said power shaft and power drive and comprising a manually and longitudinally movable draw bar having a slot at its upper end and a lateral notch below said slot; an engagement lever fulcrumed on said frame and arranged to control said coupling; a throw-out lever also fulcrumed on said frame and actuated by said main shaft; a swinging rod having a sliding pivot at its upper end which pivotally connects said rod with said throw-out lever and is slidably received within said slot of said draw bar; a trunnion head slidably arranged at the central part of said swinging rod and having its ends adapted to be received within said lateral notch of said draw bar; an adjustment nut arranged at the lower end of said swinging rod; and a compression spring arranged on said rod between the adjustment nut thereof and the lower face of said trunnion head.

9. A nonrepeating clutch associated with a machine having a frame, a main shaft, a power drive and a coupling adapted to connect said power shaft and power drive and comprising: a manually rotatable rock shaft; a rock arm secured thereto; an upright draw bar pivoted at its lower end to said rock arm and having a slot at its upper end and a lateral notch below said slot; an engagement lever fulcrumed on said frame and arranged to control said coupling; a throw-out lever fulcrumed on the same fulcrum as that of said engagement lever and actuated by said main shaft; a swinging rod having a sliding pivot at its upper end which pivotally connects said rod with said throw-out lever and is slidably received within said slot of said draw bar; a trunnion head slidably arranged at the central part of said swinging rod and having its ends adapted to be received within said lateral notch of said draw bar; and a resilient connection between said trunnion head and said swinging rod.

In testimony whereof I hereby affix my signature.

PAUL R. HAHNEMANN.